(12) United States Patent
zur Loye et al.

(10) Patent No.: US 7,951,860 B2
(45) Date of Patent: May 31, 2011

(54) POLYMER COMPOSITE MATERIALS AND METHODS FOR PRODUCING THE SAME

(75) Inventors: Hans-Conrad zur Loye, Columbia, SC (US); Tara Hansen, League City, TX (US); Baolong Zhang, College Station, TX (US); John W. Stone, Nashville, TN (US)

(73) Assignee: University of South Carolina, Columbia, SC (US)

( * ) Notice: Subject to any disclaimer, the term of this patent is extended or adjusted under 35 U.S.C. 154(b) by 490 days.

(21) Appl. No.: 11/632,791

(22) PCT Filed: Jul. 22, 2005

(86) PCT No.: PCT/US2005/026200
§ 371 (c)(1),
(2), (4) Date: Sep. 1, 2009

(87) PCT Pub. No.: WO2006/012581
PCT Pub. Date: Feb. 2, 2006

(65) Prior Publication Data
US 2010/0056678 A1    Mar. 4, 2010

Related U.S. Application Data

(60) Provisional application No. 60/590,519, filed on Jul. 23, 2004, provisional application No. 60/590,522, filed on Jul. 23, 2004.

(51) Int. Cl.
*C08K 5/5317* (2006.01)

(52) U.S. Cl. ........ 524/124; 524/123; 524/130; 524/445; 524/447

(58) Field of Classification Search .................. 524/123, 524/124, 130, 445, 447
See application file for complete search history.

(56) References Cited

U.S. PATENT DOCUMENTS

| | | |
|---|---|---|
| 4,276,411 A | 6/1981 | DiGiacomo et al. |
| 4,889,885 A | 12/1989 | Usuki et al. |
| 5,760,121 A | 6/1998 | Beall et al. |
| 6,034,163 A | 3/2000 | Barbee et al. |
| 6,071,988 A | 6/2000 | Barbee et al. |
| 6,084,019 A | 7/2000 | Matayabas, Jr. et al. |
| 6,162,857 A | 12/2000 | Trexler, Jr. et al. |
| 6,337,046 B1 | 1/2002 | Bagrodia et al. |
| 6,359,052 B1 | 3/2002 | Trexler, Jr. et al. |
| 6,384,112 B1 | 5/2002 | Boussad |
| 6,395,386 B2 | 5/2002 | Bagrodia et al. |
| 6,417,262 B1 | 7/2002 | Turner et al. |
| 6,486,252 B1 | 11/2002 | Barbee et al. |
| 6,486,253 B1 | 11/2002 | Gilmer et al. |
| 6,486,254 B1 | 11/2002 | Barbee et al. |
| 6,548,587 B1 | 4/2003 | Bagrodia et al. |
| 6,552,113 B2 | 4/2003 | Bagrodia et al. |
| 6,586,500 B2 | 7/2003 | Bagrodia et al. |
| 6,653,388 B1 | 11/2003 | Barbee et al. |
| 6,737,464 B1 | 5/2004 | Bagrodia et al. |
| 7,166,656 B2 | 1/2007 | Majumdar et al. |
| 7,199,172 B2 | 4/2007 | Rule |
| 2003/0100656 A1* | 5/2003 | Majumdar et al. ............ 524/445 |
| 2005/0239938 A1* | 10/2005 | Rule ............................. 524/414 |
| 2009/0089941 A1* | 4/2009 | zur Loye et al. .................. 8/506 |

FOREIGN PATENT DOCUMENTS
WO    WO 2006012581 A2    2/2006

OTHER PUBLICATIONS

*Article—Metal-Phosphonate Chemistry,* Abraham Clearfield; Progress in Inorganic Chemistry vol. 47, pp. 371-510, 1998.

\* cited by examiner

*Primary Examiner* — Peter Szekely
(74) *Attorney, Agent, or Firm* — Dority & Manning, P.A.

(57) ABSTRACT

Polymer composite materials having improved gas barrier properties are generally disclosed, along with process of making the same. The polymer composite materials can include phosphonate particles, oxide particles, and combinations thereof. For example, the particles can be metal phosphonate particles, synthetic oxide particles, or combinations thereof.

34 Claims, No Drawings

POLYMER COMPOSITE MATERIALS AND METHODS FOR PRODUCING THE SAME

PRIORITY INFORMATION

This application claims benefit of International Patent Application, Serial Number PCT/US2005/026200, titled "Polymer Composite Materials and Methods for Producing the Same," filed Jul. 22, 2005, which claims priority to U.S. Provisional Patent Application No. 60/590,522, filed on Jul. 23, 2004, titled "Polymer Composite Materials Containing Metal Phosphonates" and U.S. Provisional Patent Application No. 60/590,519, filed on Jul. 23, 2004, titled "Polymer Composite Materials Containing Synthetic Oxide Particles and Process for Producing the Same," all of which are hereby incorporated by reference in their entirety.

BACKGROUND OF THE INVENTION

Polymeric materials are used in an almost limitless variety of applications. For instance, thermoplastic polymers are used to form films, fibers, filaments, and may also be molded or extruded into various useful articles. For example, polymeric materials are commonly used to form various containers, thereby replacing conventionally used glass materials.

As opposed to glass materials, however, some polymeric materials have inferior gas barrier properties in comparison to glass. For example, although polyesters, such as polyethylene terephthalate (PET), are widely used in constructing bottles and containers which are used for carbonated beverages, fruit juices, and certain foods, the polyesters unfortunately have limited barrier properties with regard to oxygen, carbon dioxide and the like. As such, in the past, these materials have been used sparingly in applications where relatively high gas barrier properties are needed. For instance, polyester containers are not always well suited for products requiring a long shelf life. Polyester bottles may also cause food products, such as beer and wine, to spoil due to oxygen permeability. Due to these shortcomings, those skilled in the art have attempted to improve the gas barrier properties of polymers.

For example, in the past, organically treated natural clays have been incorporated into polymers, such as polyesters, in order to improve the barrier properties of the materials. If well dispersed within the polymer, the clay particles diminish the permeability of gases through the polymer by making the path for gas diffusion more tortuous. The barrier enhancement generally depends upon the aspect ratio of the particles and the degree of exfoliation of the particles in the polymer.

One challenge has been to maximize the exfoliation of the clay into the polymeric material. In order to maximize exfoliation, in the past, clays such as montmorillonite, prior to being combined with a polymer were first ground or pulverized to a very small size. In many applications, impurities such as quartz were then removed from the clay particles. After being ground or pulverized, the clay materials exist as a fine powder. For example, the clay materials may comprise relatively large agglomerations that contain many layers of individual platelets that are closely stacked together. During exfoliation, the object is to break as many layers apart so as to form single layer particles or particles that have only a few layers, which are referred to as tactoids.

In order to separate the layers so that the clay material becomes exfoliated into a polymer, in the past, the clay material has been combined with various organic cations, such as ammonium ions. Examples of polymer/clay composite materials as described above are disclosed, for instance, in U.S. Pat. Nos. 6,034,163; 6,071,988; 6,084,019; 6,162,857; 6,337,046; 6,359,052; 6,384,112; 6,395,386; 6,417,262; 6,486,252; 6,486,253; 6,486,254; 6,548,587; 6,552,113; 6,586,500; 6,653,388; and 6,737,464, which are all incorporated herein by reference.

Although the above body of work represents great improvements and advancements in the art of forming polymer composite materials having improved barrier properties, further improvements still remain. In particular, a need exists for a material capable of improving the gas barrier properties of polymer that may more easily be exfoliated into the polymer. A need also exists for a particle that may be exfoliated into polymers that does not contain substantial amounts of impurities. A need further exists for a particle that can be exfoliated into polymers in relatively great amounts when necessary for various applications. A need further exists for an improved process for exfoliating particles into a polymeric material.

SUMMARY OF THE INVENTION

In general, the present disclosure is directed to polymer composite materials that, in one embodiment, have improved gas barrier properties. In addition to gas barrier applications, however, it should be understood that the composite polymeric materials may be used in various other applications. For instance, the composite materials may be formulated to have physical properties that are particularly well suited for a specific application.

In accordance with the present invention, the polymer composite material can comprise phosphonate particles, oxide particles, or combinations thereof dispersed within a polymer matrix. The particles may have a plate-like shape and may have a thickness, for instance, of less than about 3 nm, such as less than about 2 nm, such as about 1 nm. The particles may have a largest dimension of less than about 3,000 nm, such as less than about 2,000 nm or less than about 1,000 nm. For example, in one particular embodiment, the particles may have a thickness of about 1 nm and have a length and width of from about 250 nm to about 750 nm.

For example, the polymer composite material can comprise phosphonate particles. In one embodiment, the phosphonate particles comprise metal phosphonate particles.

In one embodiment, the metal phosphonate may be represented by the following formula:

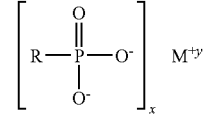

wherein M comprises a metal cation. The metal cation in many applications has a valence of from about +2 to about +4. Metal cations that may be used include titanium, barium, zinc, calcium, strontium, and the like.

R represented in the above formula comprises an organic group and can vary dramatically depending upon the particular application and the desired results. R can be, for instance, an alkyl, an aromatic such as a phenyl group, or a functional group. In one particular embodiment, R comprises a carboxy alkyl group, such as a carboxy ethyl group.

In another exemplary embodiment, the polymer composite material can comprise synthetic oxide particles dispersed with a polymer matrix. In the past, naturally occurring clays have been incorporated into polymers for improving the barrier properties of the material. The natural occurring clays, however, typically have to be cleaned and then chemically modified in order to disperse the clay particles into the polymeric matrix. Instead of incorporating naturally occurring clay particles into polymers, however, the present invention is directed to using synthetic oxide materials. As used herein, the term "synthetic" refers to the fact that the particles are synthesized artificially or are man-made.

Various synthetic oxide particles may be used in accordance with the present invention. For example, in one embodiment, a synthetic phyllosilicate, such as a smectite material may be used. Smectites are one of the largest classes of the phyllosilicate group.

In general, a phyllosilicate is dioctahedral if two of the octahedral sites are occupied by trivalent cations, and trioctahedral if all three octahedral sites are filled with divalent cations. In some applications, the synthetic oxide particles used in the present invention comprise trioctahedral smectites. The smectite may be, for instance, a hectorite.

Hectorites produced according to the present invention may, in one embodiment, have one of the following general chemical formulas:

$$Ex_{x/n}{}^{n+}[Mg_{6-x}Li_x][Si_8]O_{20}(OH,F)_4 \cdot nH_2O$$

$$Ex_{x/n}{}^{n+}[Mg_{6-x}Li_x][Si_8]O_{20}(OH)_4 \cdot nH_2O$$

wherein EX represents an exchangeable cation. The exchangeable cation may be, for instance, any suitable Group I or Group II metal. For example, in various embodiments, the exchangeable cation may comprise sodium, potassium, or lithium. In other embodiments, however, the exchangeable cation may be derived from an organic salt, such as an alkyl ammonium cation. An example of an alkyl ammonium cation, for instance, is tetra ethyl ammonium (TEA).

In one embodiment, the above hectorite materials may be organically modified. For example, silanes may be incorporated into the structure. Specifically, one or more of the hydroxy (OH) groups may be replaced by an organic group (R group). The R group may be, for instance, an alkyl group such as a methyl group or an aromatic group such as a phenyl group. In the case of phenyltriethoxysilane modified hectorite, phenyl groups become present between the layers. These phenyl groups can be further modified if desired. Organically modifying the hectorite structure may create a material that more easily exfoliates.

In another embodiment, the phyllosilicates used according to the present invention comprise saponite or stevensite materials. Saponite materials may be made according to the following formula:

$$Ex_{x/n}{}^{n+}[Mg_6][Si_{8-x}Al_x]O_{20}(OH)_4 \cdot nH_2O$$

Stevensite materials may be made according to the following formula:

$$Ex_{x/n}{}^{n+}[Mg_{6-x}Vacancy_x][Si_8]O_{20}(OH)_4 \cdot nH_2O$$

In addition to phyllosilicates, the synthetic oxide particles may also comprise synthetic perovskites, and particularly synthetic layered perovskites. Layered perovskites include the Ruddlesden-Popper perovskites, the Dion-Jacobson perovskites and the Aurivillius perovskites. Layered perovskites maintain an octahedral network in only two directions, forming 2-dimensional perovskite-like sheets separated by a layer of cations. The Dion-Jacobson perovskites may be represented as follows:

$$A(A'_{n-1}B_nX_{3n+1})$$

the Ruddlesden-Popper perovskites may be represented as follows:

$$A_2(A'_{n-1}B_nX_{3n+1})$$

and the Aurivillius perovskites may be represented as follows:

$$Bi_2O_2(A'_{n-1}B_nX_{3n+1})$$

wherein A is a mono or divalent cation, B is a cation and X is an anion, such as an oxide or a halide.

In many embodiments, A, A', and B are all metal cations. For example, A and/or A' may comprise a Group I or a Group II metal. B may, in some embodiments, comprise a +2 to +6 metal. One particular embodiment of a synthetic layered perovskite comprises $KCa_2Nb_3O_{10}$.

Prior to being incorporated into a polymer matrix, in one particular embodiment, the synthetic layered perovskite may undergo a proton exchange with an organic cation. Specifically, A in the above formula may be replaced by an organic cation, such as an alkyl ammonium cation. For example, in one embodiment, the ammonium cation may comprise tetra (n-butyl) ammonium.

According to the present disclosure, the metal phosphonate particles, the synthetic oxide particles, or combinations thereof may be incorporated into the polymer matrix in an amount up to about 80% by weight, such as in an amount up to about 50% by weight. When attempting to improve the gas barrier properties of the polymer matrix, the particles may be incorporated into the polymer in an amount sufficient to reduce gas permeability to a desired level. For instance, the particles may be incorporated into the polymer matrix in an amount less than about 20% by weight, such as less than about 10% by weight. For example, in one embodiment, the particles may be incorporated into the polymer matrix in an amount less than about 5% by weight, such as less than about 3% by weight. In fact, in some applications, the particles may be incorporated into a polymer in an amount less than about 2% by weight, such as from about 0.25% to about 1% by weight.

The polymer matrix may be made from various polymers, including homopolymers, copolymers and terpolymers. The polymer may comprise a thermoplastic polymer or a thermoset polymer. Examples of thermoplastic polymers include polyetheresters, polyamides, polyesteramides, polyurethanes, polyimides, polyetherimides, polyureas, polyamideimides, polyphenyleneoxides, phenoxy resins, polyethylene-co-vinyl alcohols, polyvinyl alcohols, polyolefins, and the like.

In one particular embodiment, the polymer matrix comprises a polyester, such as polyethylene terephthalate.

The polymer composite material may be made into various useful articles. For instance, the polymer composite material may be made into films, fibers or molded articles, such as containers.

In addition to the polymer composite materials as described above, the present invention is also directed to processes for preparing a polymer composite material. For example, the process can include the steps of suspending metal phosphonate particles, synthetic oxide particles, or combinations thereof as described above into a liquid. The particles can be substantially exfoliated into the liquid. The resulting suspension can be then combined with a monomer, and the monomer can be polymerized to form a polymer composite material.

Also, the particles can be substantially exfoliated directly into the monomer.

In one particular embodiment, for instance, the particles may be exfoliated into ethylene glycol. The ethylene glycol suspension may then be combined with a polyester monomer and polymerized. The particles may be incorporated into the ethylene glycol until the maximum carrying capacity of the liquid is reached. For example, the particles may be incorporated into the ethylene glycol in an amount up to about 5% by weight, such as in an amount up to about 2% by weight.

Other features and aspects of the present invention are discussed in greater detail below.

DETAILED DESCRIPTION

It is to be understood by one of ordinary skill in the art that the present discussion is a description of exemplary embodiments only, and is not intended as limiting the broader aspects of the present invention.

In general, the present invention is directed to polymeric composite materials that comprise a polymer matrix containing nano-sized particles. In accordance with the present invention, the particles dispersed throughout the polymer matrix comprise metal phosphonate particles, synthetic oxide particles, or combinations thereof.

In one embodiment, the particles dispersed throughout the polymer matrix comprise metal phosphonate particles. The metal phosphonate particles have been found to more easily exfoliate into the polymer matrix in comparison to many conventional materials, such as clays. Further, the phosphonate particles may be synthesized without containing any detectable impurities. In one application, the metal phosphonate particles may be incorporated into a polymer in order to improve the gas barrier properties of the polymer. In other embodiments, however, the particles may be incorporated into a polymer for other advantages and benefits, such as by improving or modifying the physical properties of the polymer.

Metal phosphonates useful in the present invention may be indicated by the following formula:

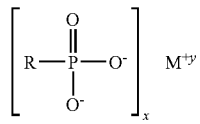

wherein M is a metal cation, X is the number of phosphonate anions associated with the metal cation, and R may be any suitable organic group. For instance, R may be an alkyl, an aromatic group such as a phenyl group, or any suitable functional group. In one embodiment, for instance, R is a carboxy alkyl group, such as a carboxy ethyl or carboxy methyl group. R can be any organic group such as an alkyl, amine, ether, polyether, aromatic ether, ester, aromatic ester, polyamide, alkoxy, and the like.

The metal cation present in the phosphonate may comprise any suitable metal. The metal cation, for instance, may have a valence (y) of +1 to about +5, and particularly from about +2 to about +4. The metal cation, for instance, may comprise a Group II metal or a transition metal. Particular examples of metal cations that may be used to produce the phosphonate include titanium, barium, zinc, zirconium, hafnium, calcium, strontium, and the like.

Of particular advantage, the R group and the metal cation for the metal phosphonate may be selected in order to produce phosphonate particles having particular characteristics and properties. For instance, the R group and the metal cation may be selected so as to produce particles having a particular size, having a particular shape, having a particular color, and the like. Selection of the R group and the metal cation also may impact the ease by which the particles may be exfoliated in a liquid or other material. Depending upon the particular polymer that is to be mixed with the particles, selection of the R group and the metal cation may also affect the compatibility of the particles with the polymer.

Particular examples of metal phosphonates that may be used in the present invention include titanium carboxy ethyl phosphonate, titanium phenyl phosphonate, barium phenyl phosphonate, and zinc carboxy ethyl phosphonate.

As described above, selection of the metal cation and the organic group associated with the phosphonate may be used to control the resulting size of the metal phosphonate particles. In general, however, the metal phosphonate particles may have a plate-like shape. For example, the particles may have a thickness of less than about 10 nm, such as less than about 5 nm when exfoliated. The particles may have a diameter or greatest dimension in the range of from about 5 nm to about 3,000 nm, such as from about 10 nm to about 2,000 nm. For example, in one embodiment, the particles may have a diameter or greatest dimension of from about 100 nm to about 1,000 nm, such as from about 250 nm to about 750 nm. In one particular embodiment, the particles may have a thickness of about 1 nm, may have a length of about 500 nm and may have a width of about 500 nm.

The metal phosphonate particles used in the present invention may be synthesized according to any suitable method that produces particles with the desired characteristics. In one embodiment, for instance, the phosphonate particles may be synthesized by reacting a phosphonic acid with a metal salt. Phosphonic acids have the general formula R—OP(OH)$_2$, wherein the R group is the organic group incorporated into the phosphonate as explained in the metal phosphonate formula above. In producing the metal phosphonate, for instance, the metal salt may first be incorporated into an acidic solution and then combined with an aqueous solution containing the phosphonic acid. Refluxing the mixture for a sufficient amount of time causes the metal phosphonate to form as a resulting precipitate. For example, a precipitate may form almost instantaneously after refluxing begins, such as in about 1 to about 5 minutes. Increasing the time the mixture is refluxed, however, may improve the crystallinity of the product. Thus, in some embodiments, the mixture may be refluxed for an amount of time of from about less than an hour to about 48 hours or longer.

In some instances, extended reflux times have also been found to have an effect on the resulting morphology of the material. For example, the present inventors have discovered that refluxing a sample for more than about 4 days, such as about 6 days, leads to a more plate-like morphology as opposed to a more rod-like morphology. In particular, the plate-like particles were found to have a more square-like shape as opposed to the same material produced by refluxing for a shorter amount of time. The precipitate may be washed several times and dried prior to being incorporated into a polymer matrix.

In one particular embodiment, for example, titanium tetra chloride (TiCl$_4$) may be added to an acidic solution, such as a 6M HCl solution, in order to prevent hydrolysis of the metal. The metal salt solution is then combined with an aqueous solution containing 2-carboxyethylphosphonic acid and refluxed for 48 hours causing titanium carboxy ethyl phosphonate to form.

In other embodiments, titanium phenyl phosphonate may be synthesized by refluxing phenyl phosphonic acid and an acidic solution of titanium tetra chloride. Barium phenyl phosphonate may be synthesized by refluxing phenyl phosphonic acid and barium chloride in water. Zinc carboxy ethyl phosphonate may be synthesized by refluxing 2-carboxyethylphosphonic acid and $Zn(NO_3)_2 \cdot 6H_2O$ in a 5% water/acetone mixture for 2 hours letting the acetone slowly evaporate. After the acetone is evaporated, fresh water is added to form the metal phosphonate.

Other metal phosphonate compounds may be synthesized by reacting a nitrogen containing bisphosphonic acid with a metal salt, resulting in a compound having the general formula:

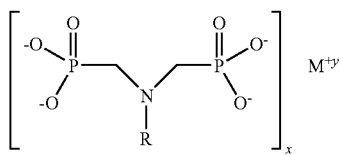

wherein M is a metal cation with valance y, x is the number of phosphonate anions associated with the metal cation, and R may be any suitable organic group. R can be any organic group such as an alkyl, ether, polyether, aromatic ether, ester, aromatic ester, polyamide, alkoxy, and the like. For example, R can be a butyl group or an carboxylic group, such as p-COOH—$C_6H_4$—$CH_2$—.

For example, the nitrogen containing bisphosphonic acids can be prepared following a Mannich type reaction according to the general equation given below, the general formula of

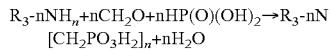

wherein n is 1, 2, or 3. The reaction can proceed in an aqueous environment and can be acid catalyzed. The synthesized bisphosphonic acid may then be reacted with a metal cation, such as calcium or titanium, resulting in the formation of a metal diphosphonate. For instance, this reaction can take place in a reflux environment starting from a metal salt and bisphosphonic acid in the presence of water or a water/ethanol mix. The resulting powder can then be heated, such as in a par bomb equipped with a Teflon liner at 160 C. for 4 days in the presence of 1 mL of water resulting in crystal nucleation and subsequent growth.

In another embodiment, the particles dispersed throughout the polymer matrix can comprise synthetic oxide particles. The synthetic oxide particles have been found to more easily exfoliate into the polymer matrix in comparison to many conventional materials, such as naturally occurring clays. Further, the synthetic oxide particles may be synthesized without containing any significant quantities of impurities. In one application, the synthetic oxide particles may be incorporated into a polymer in order to improve the gas barrier properties of the polymer. In other embodiments, however, the particles may be incorporated into a polymer for other advantages and benefits, such as by improving or modifying the physical properties of the polymer.

Synthetic oxides useful in the present invention include any synthetic oxides that have a plate-like shape with a thickness of less than about 5 nm and that are capable of being exfoliated into a polymer. In one particular embodiment, for instance, the synthetic oxide particles comprise a synthetic phyllosilicate. In an alternative embodiment, the synthetic oxide particles comprise synthetic layered perovskite particles.

One example of synthetic phyllosilicates that may be used in the present invention include synthetic hectorite particles. Hectorite generally has a 2:1 layered structure, where each layer is made up of two tetrahedral silicate sheets that sandwich a central metal oxygen octahedral layer. In between each layer resides an exchangeable cation, such as lithium, to balance the overall negative charge of the layer. As used herein, the term "hectorite" is intended to include all hectorite materials, hectorite-like materials, and chemically modified hectorite materials.

Synthetic hectorite particles, in one embodiment, may be represented by one of the following formulas:

$$Ex_{x/n}^{n+}[Mg_{6-x}Li_x][Si_8]O_{20}(OH,F)_4 \cdot nH_2O$$

$$Ex_{x/n}^{n+}[Mg_{6-x}Li_x][Si_8]O_{20}(OH)_4 \cdot nH_2O$$

wherein EX comprises an exchangeable cation, such as a Group I metal, a Group II metal, or an organic cation. The organic cation may comprise an alkyl ammonium cation, such as tetra ethyl ammonium (TEA). Particular examples of hectorites according to the above formula that may be used in the present invention include lithium hectorite, TEA hectorite, sodium hectorite, potassium hectorite, and mixtures thereof.

Of particular advantage, the exchangeable cation incorporated into the synthetic hectorite may be selected in order to produce synthetic particles having particular characteristics and properties. For instance, the exchangeable cation may be selected so as to produce particles having a particular size, having a particular shape, having a particular color, and the like. Selection of the exchangeable cation may also impact the ease by which the particles may be exfoliated into a liquid or other material. Depending upon the particular polymer that is to be mixed with the particles, selection of the exchangeable cation may also affect the compatibility of the particles with the polymer.

In one embodiment, the above hectorite particles may be modified for many different purposes, such as to improve the compatibility of the material with a particular polymer. For example, the edges and/or the faces of the hectorite particles may be chemically modified. For example, in one particular embodiment, a silane may be incorporated into the hectorite synthesis to modify the hectorite edges and faces.

Silane-functionalized hectorite may be synthesized by, for instance, incorporating an organotrialkoxysilane into the hectorite material. Particular examples of silanes that may be incorporated into the hectorite material include an alkoxysilane, such as tetraethoxysilane, 3-glycidoxypropyl trimethyl silane, or phenyltriethoxysilane. The organo groups as described above may become incorporated between the layers of the hectorite structure.

In addition to phyllosilicates, in an alternative embodiment, the synthetic oxide particles comprise a layered perovskite. Synthetic perovskites that may be used in the present invention, for instance, include Dion-Jacobson perovskites, Ruddlesden-Popper perovskites, and Aurivillius perovskites. It should be understood, however, that in addition to the above perovskites, the term "perovskite" as used herein is intended to include all perovskite structures and all perovskite-related oxides.

For exemplary purposes, Dion-Jacobson perovskites may be indicated as follows:

$$A(A'_{n-1}B_nX_{3n+1}),$$

Ruddlesden-Popper perovskites may be represented as follows:

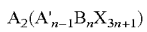
$$A_2(A'_{n-1}B_nX_{3n+1})$$

and Aurivillius perovskites may be represented as follows:

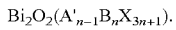
$$Bi_2O_2(A'_{n-1}B_nX_{3n+1}).$$

In the above formulas, A and A' represent mono or divalent cations. For example, the A and/or A' cations may comprise a Group I metal or a Group II metal. In other embodiments, an organic cation may be used, such as an alkyl ammonium, methoxy groups, and the like. For instance, examples of alkyl ammonium cations include tetra butyl ammonium (TBA) or tetra ethyl ammonium (TEA). B in the above formulas comprises a cation, such as a multivalent cation. B, for instance, can be a Group II metal or a transition metal. For instance, in one embodiment, B is niobium or titanium.

X in the above formulas represents an anion. For many applications, for instance, X is an oxygen atom. In other embodiments, X may be a halide.

Particular examples of Dion-Jacobson layered perovskites that may be synthesized and used in accordance with the present invention include $KCa_2Nb_3O_{10}$ or $TBA-Ca_2Nb_3O_{10}$.

Similar to the hectorites, the choice of A, B and X in the above formulas may have an impact upon the type of particles that are produced. Of particular advantage, since the particles are synthesized, A, B and X may be varied in order to produce particles that are particularly well suited for a particular application.

In general, the synthetic oxide particles may have a plate-like shape. For example, the particles may have a thickness of less than about 10 nm, such as less than about 5 nm when exfoliated. The particles may have a diameter or greatest dimension in the range of from about 5 nm to about 3,000 nm, such as from about 10 nm to about 2,000 nm. For example, in one embodiment, the particles may have a diameter or greatest dimension of from about 100 nm to about 1,000 nm, such as from about 250 nm to about 750 nm.

The synthetic oxide particles used in the present invention may be synthesized according to any suitable method that produces particles with the desired characteristics. In one embodiment, for instance, when producing hectorite particles, a lithium salt, a magnesium salt, and a silica source are reacted together optionally in the presence of another metal or organic salt.

For example, when producing lithium hectorite, a lithium salt such as LiF or LiOH may be combined with magnesium hydroxide and a silica source such as a silica gel, a silica sol or an alkoxysilane. The mixture may be combined in water and refluxed for from about 12 hours to about 3 days. Alternatively, a combination of reflux treatment and a hydrothermal treatment of the mixture, or only an hydrothermal treatment of the mixture, may be used. The mixture can be treated for about 12 to about 48 hours, such as about 12 hours.

In order to produce other synthetic hectorite particles, other metal or organic salts such as sodium chloride, potassium chloride, or tetra ethyl ammonium chloride may be incorporated into the initial reactants. Inclusion of the above metal or organic salts produce sodium hectorite, potassium hectorite, and TEA hectorite respectively.

Many synthetic layered perovskites, on the other hand, may be synthesized using a conventional solid state reaction. For example, in order to produce $KCa_2Nb_3O_{10}$, $K_2CO_3$, $CaCO_3$, and $Nb_2O_5$ may be combined and heated to a temperature greater than about 1000° C., such as from about 1100° C. to about 1200° C. for from about 24 to about 48 hours.

The metal phosphonate particles, synthetic oxide particles, or combinations thereof may be incorporated into the polymer matrix in an amount up to about 80% by weight, such as in an amount up to about 50% by weight. When attempting to improve the gas barrier properties of the polymer matrix, the particles may be incorporated into the polymer in an amount sufficient to reduce gas permeability to a desired level. For instance, the particles may be incorporated into the polymer matrix in an amount less than about 20% by weight, such as less than about 10% by weight. For example, in one embodiment, the particles may be incorporated into the polymer matrix in an amount less than about 5% by weight, such as less than about 3% by weight. In fact, in some applications, the particles may be incorporated into a polymer in an amount less than about 2% by weight, such as from about 0.25% to about 1% by weight.

The metal phosphonates and synthetic oxides that are synthesized as described above generally are in the form of relatively large agglomerations after formation. The agglomerations have a layered structure. When the particles are to be incorporated into a polymer for improving the gas barrier properties of the polymer, the layered structures may be broken down in a process known as exfoliation. During exfoliation, the layered structure is broken down such that the resulting particles have a thickness in the nanometer size range. Of particular advantage, the present inventors have discovered that particles may be exfoliated in a relatively simple process without having to treat the metal phosphonates or synthetic oxides with various chemical additives.

After exfoliation, the particles may be present in individual layers or may be present as tactoids which may contain from about 2 to about 20 layers of the material. Exfoliation according to the present invention may occur in various carrier materials. For instance, the carrier material may be a liquid or a solid. In one particular embodiment, the particles may be exfoliated directly into a polymer during melt processing.

In one embodiment, the present inventors have discovered that particles may be easily exfoliated into various liquids. The liquids may then be incorporated into a polymer, for instance, during formation of the polymer.

For example, metal phosphonate particles and synthetic oxide particles have been found to be easily exfoliated into liquids such as aqueous solutions including water, liquid glycols, or various other solvents. Once exfoliated into the liquid, a suspension forms that is relatively stable. The suspension may contain an ingredient that reacts with a monomer to form a polymer or may otherwise be present during the polymerization of a polymer. In this manner, the metal phosphonate particles and/or synthetic oxide particles may be incorporated into any polymeric material that is capable of being polymerized in the presence of a liquid. Such polymers include polymers that form in a solution polymerization process or in an emulsion polymerization process. In other embodiments, the particles may be incorporated into a polymer that is dissolved in a liquid and later reformed.

In one particular embodiment, for instance, metal phosphonate particles and/or synthetic oxide particles are exfoliated in an aqueous solution. The aqueous solution may consist essentially of water or may contain water and other liquids. For example, in one embodiment, a base, may be added in order to facilitate exfoliation. The base may be, for instance, an organic base or a metal hydroxide, such as sodium hydroxide. In other embodiments, however, a base may not be needed. For example, in some embodiments, the metal phosphonate particles are held together through hydrogen bonding. When a base such as sodium hydroxide is added to an aqueous solution containing the particles, the sodium cation serves to break the hydrogen bonds causing electrostatic repulsion.

Once the particles are added to the aqueous solution, the solution may be subjected to various physical forces until the particles are substantially exfoliated. For example, the solution may be subjected to shear forces by stirring the solution or by sonicating the solution. In general, as many particles as possible are added to the aqueous solution. For instance, the particles may be added until the solution has reached its maximum carrying capacity. For many applications, for instance, the metal phosphonate particles and/or synthetic oxide particles may be added to the aqueous solution in an amount up to about 10% by weight, such as in an amount up to about 5% by weight. In one embodiment, for example, the metal phosphonate particles and/or synthetic oxide particles may be added to the aqueous solution in an amount from about 1% to about 2% by weight.

The percentage of particles that become exfoliated in the aqueous solution depends on various factors, including the particular metal phosphonate and/or synthetic oxide particles that are used. In general, it is believed that at least 80% of the particles may become exfoliated in the liquid, such as at least about 85% of the particles. As described above, once exfoliated, the particles are in the form of a single layer of the material or in the form of tactoids containing a relatively small amount of layers, such as less than about 20 layers. After exfoliation, various physical means may be used in order to remove any larger particles. For example, the larger particles may settle out and be removed or the solution may be centrifuged in order to remove the larger particles.

The resulting suspension has been found to be relatively stable. In order to be incorporated into a polymer matrix, the aqueous suspension may be mixed with a polymer during extrusion, mixed with a monomer which is then polymerized into a polymer, or may be combined with a solution containing a dissolved polymer for later forming films and the like.

In addition to aqueous solutions, the metal phosphonate particles and/or synthetic oxide particles may also be exfoliated into other liquids. For example, when exfoliating the particles into a polyester, such as PET, the particles may first be exfoliated into ethylene glycol. Ethylene glycol has been found to act as a swelling agent that causes the individual metal phosphonate particles and/or synthetic oxide particles to swell and break apart when subjected to shear forces, such as during sonication. After exfoliation, an ethylene glycol suspension containing the particles is formed. Again the suspension may contain the particles in an amount up to about 5% by weight, such as in an amount up to about 2% by weight. Further, the suspension may be centrifuged in order to remove any particles that are not exfoliated.

Of particular advantage in this embodiment, ethylene glycol is an original reactant in the formation of PET polymers. Thus, the ethylene glycol suspension may be combined with a PET monomer, such as bishydroxyethylterepthalate. The monomer and ethylene glycol suspension may then be heated in the presence of a catalyst, such as $GeO_2$ or $Sb(CH_3COO)_3$, to create a PET polymer. Through this process, the metal phosphonate particles and/or synthetic oxide particles become well dispersed throughout the PET polymer matrix. Once present in the matrix, the particles dramatically improve the gas barrier properties of the material.

However, the ethylene glycol suspension can be combined with any monomer to form a polymer having the particles well dispersed throughout the polymer matrix. For example, the monomer can be, but is not limited to, bishydroxyethylterepthalate, ethylene glycol, dimethyl isophthalate, dimethyle terephthalate, cyclohexane dimethanol, and the like.

In one embodiment, in order to facilitate exfoliation, the synthetic oxide particles may undergo a proton exchange with, for instance, an organic cation. The proton exchange may occur, for instance, with the exchangeable cation present in the synthetic particles. In one particular embodiment, for instance, the layered perovskite $KCa_2Nb_3O_{10}$ may undergo proton exchange with nitric acid ($HNO_3$) and exfoliated by reaction with tetra (n-butyl) ammonium hydroxide. After proton exchange, the perovskite may be represented by the following formula:

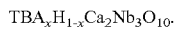

$$TBA_xH_{1-x}Ca_2Nb_3O_{10}.$$

The resulting particles may be exfoliated in a colloidal suspension in, for instance, ethylene glycol or an aqueous solution as previously described.

Exfoliating the metal phosphonate and/or synthetic oxide particles into a liquid prior to being combined with a polymer ensures that the particles are well dispersed throughout the polymer.

In other embodiments, however, the metal phosphonate particles and/or synthetic oxide particles may be added directly to an extruder or otherwise melt processed with a thermoplastic polymer. In this embodiment, the particles may be combined with the thermoplastic polymer while the thermoplastic polymer is in a molten state and while the materials are under high shear forces, such as may occur in a screw extruder. In this manner, the particles may be exfoliated into the polymer without the necessity of first exfoliating the particles into a liquid.

As described above, in still another embodiment of the present invention, the metal phosphonate particles and/or synthetic oxide particles may be exfoliated in a liquid, such as an aqueous solution that contains a soluble polymer. Once the particles are exfoliated in the liquid, the liquid may be used to form polymeric articles, such as films. In one particular embodiment, for instance, the particles may be dispersed in a solution that contains agarose or polyvinyl alcohol in an amount less than about 10% by weight, such as less than about 5% by weight. For example, in one embodiment, the solution may contain one of the polymers in an amount of about 1% by weight. The metal phosphonate particles and/or synthetic oxide particles may be incorporated into the solution in an amount up to about 80% by weight, such as from about 20% by weight to about 50% by weight. Of particular advantage, the present inventors have found that films made containing up to 50% by weight of the particles remain transparent even at the relatively high particle loading.

In general, the metal phosphonate particles and/or synthetic oxide particles may be added to any polymeric material that is compatible with the particles. The particles may be added to the polymer in order to improve the barrier properties of the polymer or to otherwise change the physical properties of the material. A non-exhaustive list of polymers that may be combined with the metal phosphonate particles include polyesters such as PET, polyetheresters, polyamides, polyesteramides, polyurethanes, polyimides, polyetherimides, polyureas, polyamideimides, polyphenyleneoxides, phenoxy resins, epoxy resins, polyolefins such as polyethylenes and polypropylenes, polyacrylates, polystyrenes, polyethylene-co-vinyl alcohols, polyvinyl chlorides, polyvinyl alcohols, cellulose acetates, and the like. The particles may also be added to combinations of polymers. The polymers may comprise homopolymers, copolymers, and terpolymers. The polymers may be branched, linear, or cross-linked.

In one particular embodiment, the particles are incorporated into a polyethylene terephthalate or a copolymer thereof. The polyester may be prepared from one or more of the following dicarboxylic acids and one or more of the following glycols.

The dicarboxylic acid component of the polyester may optionally be modified with up to about 50 mole percent of one or more different dicarboxylic acids. Such additional dicarboxylic acids include dicarboxylic acids having from 3 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of suitable dicarboxylic acids include phthalic acid, isophthalic acid, naphthalene-2,6-dicarboxylic acid, cyclohexanedicarboxylic acid, cyclohexanediacetic acid, diphenyl-4,4'-dicarboxylic acid, phenylene (oxyacetic acid) succinic acid, glutaric acid, adipic acid, azelaic acid, sebacic acid, and the like. Polyesters may also be prepared from two or more of the above dicarboxylic acids.

Typical glycols used in the polyester include those containing from two to about ten carbon atoms. Preferred glycols include ethylene glycol, propanediol, 1,4-butanediol, 1,6-hexanediol, 1,4-cyclohexanedimethanol, diethylene glycol and the like. The glycol component may optionally be modified with up to 50 mole percent, preferably up to about 25 mole percent, and more preferably up to about 15 mole percent of one or more different diols. Such additional diols include cycloaliphatic diols preferably having 3 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(2-hydroxyethoxy)-benzene, 2,2b-is-(4-hydroxycyclohexyl)-propane, 2,4-dihydroxy-1,1,3,3-tetramethylcyclobutane, 2,2-bis-(3-hydroxyethoxyphenyl)-propane, 2,2-bis-(4-hydroxypropoxyphenyl)-propane and the like. Polyesters may also be prepared from two or more of the above diols.

Small amounts of multifunctional polyols such as trimethylolpropane, pentaerythritol, glycerol and the like may be used, if desired. When using 1,4-cyclohexanedimethanol, it may be the cis, trans or cis/trans mixtures. When using phenylenedi(oxyacetic acid), it may be used as 1,2; 1,3; 1,4 isomers, or mixtures thereof.

The polymer may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, trimellitic acid, pyromellitic acid and other polyester forming polyacids or polyols generally known in the art.

Suitable polyamides include partially aromatic polyamides, aliphatic polyamides, wholly aromatic polyamides and/or mixtures thereof. By "partially aromatic polyamide," it is meant that the amide linkage of the partially aromatic polyamide contains at least one aromatic ring and a nonaromatic species. Suitable polyamides have an article forming molecular weight and preferably an I.V. of greater than 0.4.

Preferred wholly aromatic polyamides comprise in the molecule chain at least 70 mole % of structural units derived from m-xylylene diamine or a xylylene diamine mixture comprising m-xylylene diamine and up to 30% of p-xylylene diamine and an aliphatic dicarboxylic acid having 6 to 10 carbon atoms, which are further described in Japanese Patent Publications No. 1156/75, No. 5751/75, No. 5735/75 and No. 10196/75 and Japanese Patent Application Laid-Open Specification No. 29697/75.

Polyamides formed from isophthalic acid, terephthalic acid, cyclohexanedicarboxylic acid, meta- or para-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred partially aromatic polyamides include, but are not limited to poly(m-xylylene adipamide), poly(m-xylylene adipamide-co-isophthalamide), poly(hexamethylene isophthalamide), poly(hexamethylene isophthalamide-co-terephthalamide), poly(hexamethylene adipamide-co-isophthalamide), poly(hexamethylene adipamide-co-terephthalamide), poly(hexamethylene isophthalamide-co-terephthalamide) and the like or mixtures thereof. More preferred partially aromatic polyamides include poly(m-xylylene adipamide), poly(hexamethylene isophthalamide-co-terephthalamide), poly(m-xylylene adipamide-co-isophthalamide), and/or mixtures thereof. The most preferred partially aromatic polyamide is poly(m-xylylene adipamide).

Preferred aliphatic polyamides include, but are not limited to poly(hexamethylene adipamide) and poly(caprolactam). The most preferred aliphatic polyamide is poly(hexamethylene adipamide). Partially aromatic polyamides are preferred over the aliphatic polyamides where good thermal properties are crucial.

Preferred aliphatic polyamides include, but are not limited to polycapramide (nylon 6), poly-aminoheptanoic acid (nylon 7), poly-aminonanoic acid (nylon 9), polyundecaneamide (nylon 11), polyaurylactam (nylon 12), poly(ethylene-adipamide) (nylon 2,6), poly(tetramethylene-adipamide) (nylon 4,6), poly(hexamethylene-adipamide) (nylon 6,6), poly(hexamethylene-sebacamide) (nylon 6,10), poly(hexamethylene-dodecamide) (nylon 6,12), poly(octamethylene-adipamide) (nylon 8,6), poly(decamethylene-adipamide) (nylon 10,6), poly(dodecamethylene-adipamide) (nylon 12,6) and poly(dodecamethylene-sebacamide) (nylon 12,8).

The most preferred polyamides include poly(m-xylylene adipamide), polycapramide (nylon 6) and polyhexamethylene-adipamide (nylon 6,6). Poly(m-xylylene adipamide) is a preferred polyamide due to its availability, high barrier, and processability.

The polyamides are generally prepared by processes that are well known in the art.

The polymers of the present invention may also include additives normally used in polymers. Illustrative of such additives known in the art are colorants, pigments, carbon black, glass fibers, fillers, impact modifiers, antioxidants, stabilizers, flame retardants, reheat aids, crystallization aids, acetaldehyde reducing compounds, recycling release aids, oxygen scavengers, plasticizers, nucleators, mold release agents, compatibilizers, and the like, or their combinations.

The amount of metal phosphonate particles and/or synthetic oxide particles incorporated into the polymer depends upon the particular application and the desired result. For example, the particles may be incorporated into a polymer in an amount up to about 80% by weight, such as about 50% by weight, especially when forming polymeric films from dissolved polymers. In other embodiments, the particles may be incorporated into the polymeric material in an amount up to about 20% by weight, such as in an amount up to about 10% by weight. When present in the polymer in order to improve the gas barrier properties of the polymer, typically it is desirable to add as little of the particles as possible while maximizing the reduction in gas permeability. In general, the greater the amount of exfoliation of the particles in the polymer the less particles are needed in order to reduce gas permeability. Of particular advantage, since both metal phosphonate particles and synthetic oxide particles may be easily exfoliated in liquids, relatively low loading of the particles is needed in order to significantly improve the gas barrier properties of the material in some applications. In these applications, for instance, the particles may be present in the polymer matrix in an amount less than about 5% by weight, such as in an amount from about 0.5% to about 3% by weight.

In one particular embodiment of the present invention, the metal phosphonate particles and/or synthetic oxide particles may be incorporated into a polymeric material at relatively high loading. Once dispersed in the polymeric material, the polymeric material and particles mixture may be combined with greater amounts of the polymeric material or with a second polymeric material until a desired loading of the phosphonate particles is achieved.

For example, in one embodiment, the phosphonate particles and/or synthetic oxide particles may be incorporated into a polymeric material in an amount greater than about 5% by weight, such as in an amount from about 10% to about 20% by weight. Once the particles are dispersed within the polymeric matrix, for instance, the polymer may be pelletized. The pellets containing the phosphonate particles and/or synthetic oxide particles may then be combined with polymer pellets not containing the particles. Both pellets may then be melt processed together at a selected ratio in order to arrive at an overall phosphonate and/or synthetic oxide loading, such as less than about 5%. It is believed that once the particles are exfoliated and dispersed within a polymer, greater amounts of the same polymer or a different polymer may be added later during a melt processing operation and the particles will uniformly disperse throughout the resulting material. This embodiment of the present invention may provide various processing advantages. For example, when forming polyester articles, such as polyester containers, only a portion of the polyester monomer may need to be polymerized with the particles. The remaining polyester needed to reach the desired loading level may then be added later during formation of the article being produced.

In one particular application, for instance, the metal phosphonate particles and/or synthetic oxide particles may be incorporated into a lower molecular weight PET at a relatively high weight loading, such as from about 20% to about 30% by weight. The nanocomposite material may then be diluted using high molecular weight PET via extrusion such that the resulting material has a particle loading of from about 1% to about 5% by weight. The low molecular weight PET and the high molecular weight PET are physically mixed and then extruded to form a PET nanocomposite having the particles dispersed therein.

Once the metal phosphonate particles and/or synthetic oxide particles are incorporated into a polymer matrix, the polymeric composite material may be used in various applications. The polymeric material may be formed, for instance, into films, fibers, filaments, and into various molded or extruded articles. In one particular application, for instance, the metal phosphonate particles and/or synthetic oxide particles may be incorporated into a polyester for forming beverage containers. In another embodiment, the particles may be incorporated into a polymer for forming medical devices, such as devices that are intended to hold or carry blood.

The present invention may be better understood with respect to the following examples.

EXAMPLES

Exemplary Phosphonates

For exemplary purposes only, the following are processes for synthesizing various phosphonates.

Example No. 1

Synthesis of Zn Carboxy Ethyl Phosphonate—Zn (PO3CH2CH2COOH)

Zinc nitrate hexahydrate (1 mmol) was mixed with 2-carboxy ethyl phosphonic acid (1 mmol) in a 50 mL solution of 5% water/acetone. The mixture was then heated in a reflux environment for 3 days at 60 C. After the reaction was complete, the sample was filtered, washed with acetone and water and dried in air.

Synthesis of Phosphonate: $Ti(O_3PCH_2CH_2COOH)_2$ 8.01 grams of 2-carboxyethylphosphonic acid was dissolved in approximately 104 mL of distilled water. Meanwhile in a separate beaker 2.86 mL of $TiCl_4$ was added into an at least a 6M HCl solution made by dissolving approximately 47 mL of concentrated HCl with 47 mL of distilled water. The titanium solution was then added into the solution containing the dissolved phosphonic acid and the reflux was started and continued for at least 24 hours.

Example No. 2

Exfoliation of the $Ti(O_3PCH_2CH_2COOH)_2$ Into Water 0.5 grams of the phosphonate was added into an aqueous solution containing a calculated amount of NaOH and stirred on ice for 2 hours. The solution was then sonicated for at least one hour and stirred and sonicated a second time if desired. The sample was then centrifuged at 2500 rpm for 20 min at least one time to remove any un-exfoliated particles. The remaining solution contained particles which were now exfoliated and included tactoids.

The phosphonate may also be exfoliated into ethylene glycol and was done so by the addition of 0.5 grams of phosphonate into 50 mL of EG and this mixture was stirred for 48 hrs and then sonicated for 1-2 hrs. This process may be repeated if so desired. The centrifuge step was the same as described above.

Example No. 3

Formation of PET Composites

The process by which these composites were made involves the addition of the now exfoliated phosphonate to bishydroxyethylterephthalate (the PET monomer) followed by polymerization. The phosphonate may be exfoliated in EG prior to the polymerization process. If the phosphonate has been first exfoliated in water then the exfoliated particles are transferred into EG via roto evaporation before polymerization begins. Specifically, the monomer was added into the solution containing exfoliated phosphonate along with Sb(CH3COO)₃ (the catalyst used for polymerization) and the resulting mixture was heated and slowly rotated until the liquid became a gel. The composite percentages are determined simply by comparing the amount of added phosphonate to the amount of monomer added. These composites are low molecular weight (LMW) PET composites.

In addition to the above polymerization, the phosphonate may also be melt-blended in with commercial PET using a twin-screw extruder as a mechanical mixing device. This route results in composite materials having a molecular weight comparable to that of the industrial PET or high molecular weight (HMW) composites. The extruder is equipped with two feeders where one dispenses the polymer while the second slowly adds in the additive. The two feeders are adjusted in order to achieve approximately a 4 wt % weight loading but this percentage can vary.

Example No. 4

Film Formation Using $Ti(O_3PCH_2CH_2COOH)_2$

The films were prepared by first exfoliating the phosphonate as described above in 50 mL of water. In a separate beaker 0.5 grams of polymer were dissolved in water by heating and stirring the mixture. Once the polymer solution became clear, the phosphonate solution was poured in and the heat was turned off. As the solution cooled it began to form a gel at which point the gel/solution was poured into Petri dishes and was allowed to air dry to a film. It should be noted that this procedure makes a film with a 50 wt % loading of phosphonate. One can make films with a variety of percentages by varying the amount of phosphonate and/or given polymer.

Exemplary Synthetic Oxides:

Example No. 5

Perovskite
Synthesis

Potassium calcium niobium oxide ($KCa_2Nb_3O_{10}$) was made via a conventional solid state reaction of $K_2CO_3$ (1 mmol+20% excess) $CaCO_3$ (2 mmol) and $Nb_2O_5$ (1.5 mmol). The mixture was heated to 790° C. for 12 hours, cooled, and heated again to 1250° C. for 24 hours. $KCa_2Nb_3O_{10}$ was also synthesized using a KCl flux. The same amount of reactants were used and the mixture was heated to 900° C. for 12 hours. The KCl was then added and the mixture was heated to 1000° C. at a rate of 10°/min for 12 hours. All syntheses can be scaled up as needed.
Exfoliation $KCa_2Nb_3O_{10}$ was first dispersed into either water or ethylene glycol (1 wt. %). Then the mixture was heated and stirred for 24 hours. Next the mixture was sonicated for 15 minutes and then centrifuged for 15 minutes to removes larger agglomerated particles. The supernatent was again heated and stirred for one hour, sonicated for 15 minutes, and centrifuged for 15 minutes. This process was repeated up to 3 times, at which time the final mixture was centrifuged at high speeds for 30 minutes.
Polymer Preparation If the perovskite was exfoliated into water, ethylene glycol would be added in an equal amount, and the water would be removed via a rotovap apparatus. Once the material was in ethylene glycol (or if exfoliated directly into ethylene glycol) the monomer was added along with the catalyst and heated and stirred until the monomer was melted. This mixture was then heated and slowly rotated until all excess ethylene glycol was removed, and the monomer was allowed to polymerize.

Example No. 6

Hectorite
Synthesis

Hectorite was synthesized by refluxing LiF (1.32 mmol), $Mg(OH)_2$ (5.34 mmol), and a silical source (usually silical sol, 8 mmol) for 48 hours. First LiF was dissolved in water, then $Mg(OH)_2$ was added and stirred for at least one half an hour, and finally the silica sol was added.

To modify the hectorite, other silanes were used in the synthesis as part of the silica source (typically 50/50 with the silica sol). These include tetraethoxy silane (TEOS), phenyltriethoxysilane (PTES), 3-glycidoxypropyltrimethoxysilane, octadecyltriethoxysilane, and octadecyltrimethoxysilane.

To incorporate other cations such as $K^+$, $Na^+$, or $TEA^+$, the respective salt was added to the starting materials (0.2 to 0.8 mmol) and the amount added would be removed from the amount of LiF added.

Hectorite can also be synthesized hydrothermally in a Parr reaction vessel for 24 hours using the same ratios of starting materials.

All syntheses can be scaled up as needed.
Exfoliation and Polymer Preparation

The methods for exfoliation and polymer preparation of hectorite are the same as the above methods for perovskites.

These and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polymer composite material comprising:
   a polymer material; and
   particles having a greatest dimension of less than about 5,000 nm, said particles being incorporated into said polymer material, wherein said particles comprise at least one nitrogen containing bisphosphonate anion associated with a metal cation.

2. A polymer composite material according to claim 1, wherein said particles are incorporating into said polymer material in an amount up to about 80% by weight.

3. A polymer composite material according to claim 1, wherein said particles are incorporating into said polymer material in an amount of from about 0.25% to about 20% by weight.

4. A polymer composite material according to claim 1, wherein said particles are incorporating into said polymer material in an amount sufficient to reduce the gas permeability of the polymer material.

5. A polymer composite material according to claim 1, wherein said polymer material comprises a thermoplastic polymer.

6. A polymer composite material according to claim 5, wherein said thermoplastic polymer is selected from the group consisting of polyesters, polyetheresters, polyamides, polyesteramides, polyurethanes, polyimides, polyetherimides, polyureas, polyamideimides, polyphenyleneoxides, phenoxy resins, polyethylene-co-vinyl alcohols, polyvinyl alcohols, polyolefins, copolymers thereof, and mixtures thereof.

7. A polymer composite material according to claim 1, wherein said polymer material comprises polyethylene terephthalate or compolymers thereof.

8. A polymer composite material according to claim 1, wherein said particles do not contain any detectable impurities.

9. A polymer composite material according to claim 1, wherein said particles comprise phosphonate particles having the formula:

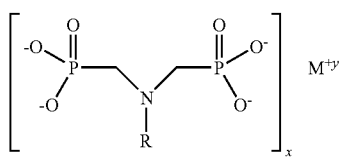

wherein M is the metal cation, y is a positive integer of from 1 to about 5, and R is an organic group, and x is the number of phosphonate anions associated with said metal cation.

10. A polymer composite material according to claim 9, wherein R is an organic group selected from the group consisting of alkyls, amines, ethers, polyethers, aromatic ethers, esters, aromatic esters, polyamides, and alkoxy groups.

11. A polymer composite material according to claim 1 further comprising synthetic oxide particles selected from the group consisting of synthetic phyllosilicates, synthetic perovskites, and combinations thereof.

12. A polymer composite material according to claim 1, wherein said particles have a thickness of less than about 10 nm and a diameter or greatest dimension in the range of from about 5 nm to about 3,000 nm.

13. A polymer composite material according to claim 1, wherein said particles have a thickness of less than about 5 nm and a diameter or greatest dimension in the range of from about 10 nm to about 2,000 nm.

14. A polymer composite material according to claim 1, wherein said particles have a thickness of about 1 nm and a diameter or greatest dimension in the range of from about 100 nm to about 1,000 nm.

15. A polymer composite material according to claim 1, wherein said particles are exfoliated into said polymer material.

16. A polymer composite material according to claim 1, wherein said particles are substantially homogenously dispersed within said polymer material.

17. A polymer composite material according to claim 1, wherein said particles have a greatest dimension of less than about 3,000 nm.

18. A polymer composite material comprising:

a polymer material; and metal phosphonate particles having a thickness of less than about 10 nm and a diameter or greatest dimension in the range of from about 100 nm to about 1,000 nm, said particles being incorporated into said polymer material, wherein said metal phosphonate particles comprise at least one nitrogen containing bisphosphonate anion associated with a metal cation, said metal phosphonate particles having the formula:

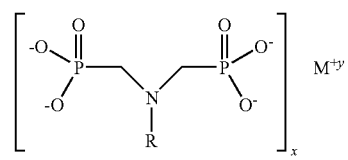

wherein M is a metal cation, v is a positive integer of from 1 to about 5, and R is an organic group, and x is the number of phosphonate anions associated with said metal cation.

19. A polymer composite material according to claim 18, wherein y is an integer of about 2 to about 4.

20. A polymer composite material according to claim 18, wherein R is an organic group selected from the group consisting of an alkyls, amines, ethers, polyethers, aromatic ethers, esters, aromatic esters, polyamides, and alkoxy groups.

21. A polymer composite material according to claim 18, wherein M is a metal selected from the group consisting of titanium, barium, zinc, zirconium, hafnium, calcium, strontium, other group II metals, and other transition metals.

22. A polymer composite material according to claim 18, wherein said particles are incorporating into said polymer material in an amount sufficient to reduce the gas permeability of the polymer material.

23. A polymer composite material according to claim 18, wherein said particles have a thickness of less than about 5 nm.

24. A polymer composite material according to claim 18, wherein said particles are exfoliated into said polymer material.

25. A process for exfoliating particles into a polymer material, comprising the step of:

combining particles with a polymeric material, wherein said particles comprise at least one nitrogen containing bisphosphonate anion associated with a metal cation.

26. A process for exfoliating particles into a polymer material as in claim 25, wherein the step of combining the particles with a polymeric material comprises the steps of:

exfoliating the particles into a monomer; and polymerizing the monomer to form a polymer composite material.

27. A process for exfoliating particles into a polymer material as in claim 26, wherein the monomer is selected from the group consisting of bishydroxyethylterephthalate, ethylene glycol, dimethyl isophthalate, dimethyl terephthalate, and cyclohexane dimethanol.

28. A process for exfoliating particles into a polymer material as in claim 26, wherein the monomer is in a molten state.

29. A process for exfoliating particles into a polymer material as in claim 26, wherein the step of exfoliating the particles into a monomer comprises the steps of:

exfoliating the particles into a liquid to form a suspension; and combining the suspension with the monomer.

30. A process for exfoliating particles into a polymer material as in claim 29, wherein the liquid comprises an aqueous solution.

31. A process for exfoliating particles into a polymer material as in claim 25, wherein the step of combining the particles with a polymeric material comprises the steps of:

providing a thermoplastic polymer in a molten state; and exfoliating the particles into the thermoplastic polymer.

32. A process for exfoliating particles into a polymer material as in claim 31, wherein said thermoplastic polymer comprises polyethylene terephthalate or a copolymer thereof.

33. A process for exfoliating particles into a polymer material as in claim 25, wherein the step of combining the particles with a polymeric material comprises the steps of:
provide a liquid containing a polymer that is soluble in the liquid;
exfoliating the particles in the liquid; and
forming the polymer material from the liquid containing both the polymer and the particles.

34. A process for exfoliating particles into a polymer material as in claim 25, wherein said phosphonate particles have the formula:

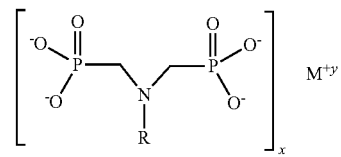

wherein M is a metal cation, y is a positive integer of from 1 to about 5, and R is an organic group, and x is the number of phosphonate anions associated with said metal cation.

* * * * *

UNITED STATES PATENT AND TRADEMARK OFFICE
CERTIFICATE OF CORRECTION

Page 1 of 1

PATENT NO.        : 7,951,860 B2
APPLICATION NO.   : 11/632791
DATED             : May 31, 2011
INVENTOR(S)       : Hans-Conrad zur Loye et al.

It is certified that error appears in the above-identified patent and that said Letters Patent is hereby corrected as shown below:

Column 20, Line 9 "...v is a positive integer..." should read --...y is a positive integer...--

Signed and Sealed this
Twenty-fourth Day of July, 2012

David J. Kappos
*Director of the United States Patent and Trademark Office*